United States Patent
Furlenmeier et al.

[11] 3,886,142
[45] May 27, 1975

[54] 6-ACYL DERIVATIVES OF AMINOPENICILLANIC ACID

[75] Inventors: Andre Furlenmeier, Basel; Paul Lanz, Muttenz; Karl Vogler, Riehen; Guido Zanetti, Reinach, all of Switzerland

[73] Assignee: Hoffmann-La Roche Inc., Nutley, N.J.

[22] Filed: Dec. 27, 1972

[21] Appl. No.: 318,736

[30] Foreign Application Priority Data
Jan. 12, 1972 Switzerland............... 434/72

[52] U.S. Cl............... 260/239.1; 424/271
[51] Int. Cl............... C07d 99/16
[58] Field of Search............... 260/239.1

[56] References Cited
UNITED STATES PATENTS

| | | | |
|---|---|---|---|
| 3,641,000 | 2/1972 | Sellstede et al. | 260/239.1 |
| 3,642,810 | 2/1972 | Bamberg et al. | 260/239.1 |
| 3,647,783 | 3/1972 | Pirie | 260/239.1 |
| 3,651,050 | 3/1972 | Nakanishi | 260/239.1 |

Primary Examiner—Nicholas S. Rizzo
Attorney, Agent, or Firm—Samuel L. Welt; Jon S. Saxe; R. Hain Swope

[57] ABSTRACT

Novel antibiotic compounds represented by the formula

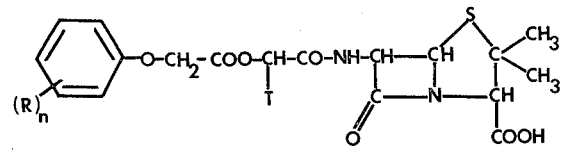

wherein R is halogen, lower alkyl, lower alkoxy, nitro, lower alkoxy-lower alkyl, dilower alkylamino, lower alkyl sulfonylamido, bis-lower alkylsulfonyl amido or lower alkanoyl amido, $n$ is an integer of 0–2 and T is a $C_2$–$C_5$ alkyl group, pharmaceutically acceptable salts thereof and hydrates of such salts, a process for their preparation and novel intermediates therefor are disclosed.

12 Claims, No Drawings

6-ACYL DERIVATIVES OF AMINOPENICILLANIC ACID

DETAILED DESCRIPTION OF THE INVENTION

The present invention is directed to novel 6-acylaminopenicillanic acid compounds represented by the general formula

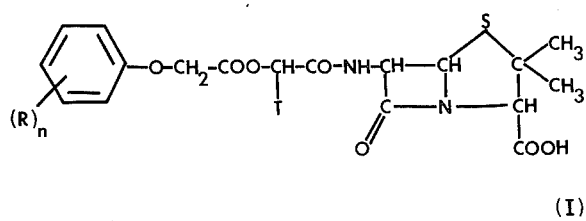

(I)

wherein R is halogen, lower alkyl, lower alkoxy, nitro, lower alkoxy-lower alkyl, di-lower alkylamino, lower alkyl sulfonylamido, bis-lower alkylsulfonyl amido or lower alkanoyl amido, $n$ is an integer of 0–2 and T is a $C_2$–$C_5$ alkyl group, pharmaceutically acceptable salts thereof and hydrates of such salts.

The invention is also directed to the preparation of the compounds of formula I utilizing the novel intermediate compounds represented by the formula

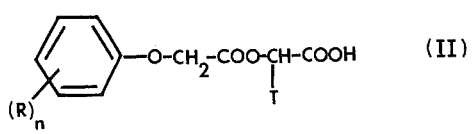

(II)

wherein R, $n$ and T are as in formula I and their reactive functional derivatives.

In accordance with the present invention, the term "halogen" represents all the halogens with fluorine, bromine and chlorine being preferred. Alkyl radicals represented by T in formulas I and II above may be straight or branched chain radicals containing 2 to 5 carbon atoms. Examples of such substituents include ethyl, n-propyl, isobutyl, n-pentyl, 3-methylbutyl and neopentyl with isobutyl being preferred. Lower alkyl and lower alkoxy radicals represented by R in the above formulas are straight- or branched-chain radicals containing 1 to 6 carbon atoms with methyl and methoxy, respectively, being preferred. The alkyl moiety of the other groups represented by R in the above formulas likewise may be straight- or branched-chain and contain from 1 to 6 carbon atoms. Preferred among each of these radicals in accordance with the invention are the following: the preferred lower alkoxy-lower alkyl group is methoxymethyl; the preferred di-loweralkylamino group is dimethylamino; the preferred lower alkanoylamido group is acetylamido and the preferred lower alkylsulfonylamido group is methylsulfonylamido.

A preferred group of 6-aminopenicillanic acid compounds in accordance with the invention are those of the above formula I where T is isobutyl or butyl and $n$ is 0 or 1 in which case R is selected from the group consisting of chloro, methyl, methoxy, nitro, dimethylamino, methylsulfonylamido, bis-methylsulfonylamido and methoxymethyl, pharmaceutically acceptable salts thereof and hydrates of such salts.

A particularly preferred group of compounds in accordance with the invention are set forth in the following Table. In the Table, the antimicrobial activity of the compounds tested is expressed in terms of the minimal inhibitory concentration in $\mu$g./ml. The minimal inhibitory concentration was determined by double dilution series in nutrient bouillon. The activity of the compounds is further demonstrated in vivo by establishing an oral $CD_{50}$ in the mouse against *Staphylococcus aureous*, and *Escherichia coli*.

TABLE

| Compound | Minimum Inhibitory Concentration [$\mu$g./ml.] | | $CD_{50}$ per os in the mouse [mg./kg.] | |
|---|---|---|---|---|
| | S. aureous FDA | E. coli 1346 | S. aureous (Schoch) | E. coli 1346 |
| A | 0.312 | 10.0 | 1.6 | 38 |
| B | 0.078 | 5.0 | 1.9 | 16 |
| C | 0.156 | 5.0 | 0.53 | 22 |
| D | 0.078 | 10.0 | 2.8 | 43 |
| E | 0.312 | 10.0 | 7.2 | >93 |
| F | 0.156 | 5.0 | 4.8 | 22 |
| G | 0.625 | 2.5 | 7.2 | 32 | wherein the compounds tested are as follows.

| Compound | Name |
|---|---|
| A | [(R)-1-[(p-methoxyphenoxy)acetoxy]-3-methylbutyl]-penicillin sodium |
| B | [(R)-1-[(p-chlorophenoxy)acetoxy]-3-methylbutyl]-penicillin sodium |
| C | [(R)-3-methyl-1-(phenoxyacetoxy)butyl]-penicillin sodium |
| D | [(R)-3-methyl-1-[(m-methylphenoxy)-acetoxy]butyl]-penicillin sodium |
| E | [(R,S)-1-[(o-nitrophenoxy)acetoxy]pentyl]-penicillin sodium |
| F | [(R)-3-[(o,p-xylyloxy)acetoxy]butyl]-penicillin sodium |
| G | [(R)-1-[(p-bis-methyl-sulfonyl-amidophenoxy)acetoxy]-3-methylbutyl]-penicillin sodium |

A preferred group of acids within the scope of formula II and their reactive functional derivatives are those wherein T is isobutyl and $n$ is 0 or 1 in which case R is selected from the group consisting of chloro, methyl, methoxy, acetylamido and dimethylamino.

In accordance with the present invention, the compounds represented by formula I are prepared by reacting 6-aminopenicillanic acid, the carboxyl group of which is in a protected form, with the novel acids represented by formula II or a reactive functional derivative thereof. Such reactive functional derivatives include, for example, halides e.g. chlorides, bromides or fluorides; azides; anhydrides-particularly mixed anhydrides with strong acids; reactive esters such as the N-hydroxysuccinimide esters; amides such as imidazoles and the like. After the reaction is completed, the protected group is cleaved off and, if desired, the product is converted into a pharmaceutical salt.

Examples of methods whereby the carboxyl of 6-aminopenicillanic acid can be protected include conversion into a readily cleavable ester such as, for example, the benzyl ester, a p-bromophenacyl ester or a silyl ester such as the trimethyl silyl ester, or by salt formation with an inorganic base, or a tertiary organic base such as, for example, triethylamine. When the condensation of 6-aminopenicillanic acid and the acid represented by formula II is completed, the ester protecting group can be easily removed by methods known in the art. For example, a benzyl ester protecting group can be removed by catalytic hydrogenation utilizing a noble metal catalyst such as palladium-carbon; a p-bromophenacyl ester group can be cleaved by means of treatment with an alkali metal thiophenolate and a silyl ester can readily be removed by treatment with water. When the carboxyl group is protected by salt formation, e.g. with triethylamine, cleavage is accomplished via treatment with acid at low temperatures, i.e. a temperature of from about 0°C. to about 10°C. Suitable acids include, for example, inorganic acids such as hydrochloric, sulfuric and phosphoric acids and organic acids such as citric acid and the like.

The reaction of 6-aminopenicillanic acid, having a protected carboxyl, and the acid represented by formula II is carried out by methods well known in the art of peptide chemistry. Thus, for example, the reaction is effected in the presence of a carbodiimide such as dicyclohexylcarbodiimide or an oxazolium salt such as N-ethyl-5-phenyl-isoxazolium-3'-sulfonate in an inert solvent. Suitable solvents include, for example, ethyl acetate, acetonitrile, dioxan, chloroform, methylene chloride, benzene, dimethylformamide and the like. In a like manner, a salt of a 6-aminopenicillanic acid such as, for example, a trialkylammonium salt is reacted with a reactive functional derivative of an acid represented by formula II in an inert solvent such as described above. The reactions are conveniently carried out at a temperature between about 5°C. and −40°C., preferably at about 0°C.

The novel penicillin compounds represented by formula I, pharmaceutical salts thereof and the acids represented by formula II can be present as optically pure isomers and as diastereomeric mixtures. The R-enantiomers, i.e. the acids represented by formula II and the compounds represented by formula I wherein the group

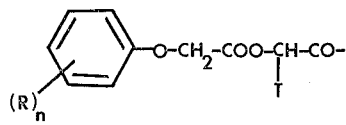

wherein R, $n$ and T are as defined above has the R configuration are preferred.

The novel acids represented by formula II can be prepared by treating a compound represented by the formula

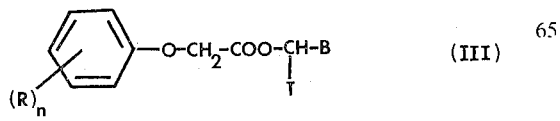

wherein R, $n$ and T have the meanings given above and B is a protected carboxyl group to convert it to the free carboxyl group.

The protected carboxyl group represented by B can be, for example, a readily cleavable ester group such as, for example, the benzyl ester or the t-butyl ester. The removal of the protecting group from the carboxyl can be carried out in the case of the benzyl group by catalytic hydrogenation utilizing a noble metal catalyst such as palladium/carbon and in the case of the t-butyl ester by acid hydrolysis utilizing a mineral acid such as hydrochloric acid, an organic acid such as trifluoroacetic acid and the like. The conversion of the thus-obtained acid into reactive functional derivatives such as described above can be carried out by methods known in the art.

The compounds represented by formula III can be prepared by methods well known in the art. For example, the carboxyl group of a compound represented by the formula

where T has the meaning given above can be protected by conventional methods, e.g. by formation of the benzyl ester or t-butyl ester, and the resulting compound reacted with a compound represented by the formula

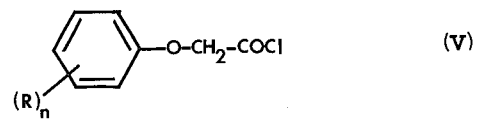

wherein R and $n$ have the meaning given above.

The novel 6-acylaminopenicillanic acid compounds provided by the present invention possess a broad spectrum of activity against both gram-positive and gram-negative micro-organisms. Their antibiotic and bacteriocidal activity allows them to be utilized both therapeutically and as disinfectants. It is preferred in accordance with the invention to administer the novel penicillin compounds described herein orally in view of their superior stability against gastric acid. It is contemplated, in the case of adults, that oral dosage forms containing 200–600 mg. are administered three or four times daily. This dosage regimen may be adjusted by the clinician as the therapeutic situation requires. The novel penicillin compounds of the invention may also be administered parenterally, rectally or topically in suitable dosage forms and may be administered in the form of their pharmaceutically acceptable salts or hydrates.

Examples of the pharmaceutically acceptable salts of the penicillin compounds represented by formula I include salts with inorganic bases such as, for example, the alkali metal salts, for example, the sodium or potassium salt, ammonium salts, alkaline earth metal salts such as, for example, the calcium salt and the like and salts with organic bases such as amine compounds, for example, N-ethyl piperidine, procaine, dibenzylamine, N,N'-dibenzylethylethylenediamine, alkylamines, dialkylamines or the like. These salts can also be hydrated. The hydration can be effected during the manufacturing process or can occur gradually as a consequence of the hygroscopic properties of an initially anhydrous salt.

For purposes of administration, the novel penicillin compound of the present invention can be combined with conventional compatible organic or inorganic pharmaceutical carrier materials known in the art. Such materials include, for example, water, gelatin, gums, lactose, starches, magnesium stearate, talc, vegetable oils, polyalkylene glycols, petroleum jelly and the like. Such pharmaceutical preparations may be in a unit dosage form and may additionally contain other therapeutically valuable substances or conventional pharmaceutical adjuvants such as preservatives, stabilizing agents, wetting agents, emulsifying agents, buffers and the like. The pharmaceutical preparations can be in conventional solid dosage forms such as tablets, capsules, dragees and the like, conventional semi-solid forms such as ointments and creams, conventional liquid forms such as solutions, suspensions, emulsions and the like and other conventional dosage forms such as dry ampules, suppositories and the like. Such preparations may be submitted to conventional pharmaceutical expedients such as, for example, sterilization and the like.

The following Examples further illustrate the invention. All temperatures are in degrees Centigrade.

EXAMPLE 1

A total of 240 g. of (R)-2-hydroxyisocaproic acid were dissolved in 1.8 liters of absolute dioxan in a three-necked flask fitted with a stirrer, thermometer and reflux condenser having a calcium chloride tube. The solution was treated successively with 285 ml. of triethylamine and 236 ml. of benzyl chloride. The mixture was heated to 100° (internal temperature) for 20 hours with stirring in an oil-bath. After cooling, the resulting triethylamine hydrochloride was filtered off and washed with 500 ml. of ethyl acetate. The filtrate was evaporated under reduced pressure at 50°. The residual oil was dissolved in 800 ml. of ethyl acetate and washed twice with 150 ml. portions of 3-N hydrochloric acid, twice with 100 ml. portions of 5% aqueous sodium chloride solution, twice with 150 ml. portions of 10% aqueous potassium bicarbonate solution and twice with 100 ml. portions of 5% aqueous sodium chloride solution. After each of these washings, the mixture was back-washed with 200 ml. of ethyl acetate. The ethyl acetate solutions were dried over magnesium sulfate and evaporated under reduced pressure at 50°. The resulting crude product was distilled at 0.3 Torr (112°–115°). There was obtained (R)-2-hydroxyisocaproic acid benzyl ester; $[\alpha]_D^{25} = +18.0°$ ($c = 1$ in methanol); $n_D^{23} = 1.498$.

A total of 18.2 g. of p-methoxyphenoxyacetic acid, 50 ml. of benzene and 30 ml. of thionyl chloride were boiled under reflux for 2 hours and evaporated at 45°. The residue was combined with 20 ml. of benzene and evaporated. This operation was repeated and the residue dried under reduced pressure at 45°. The crude p-methoxyphenoxyacetyl chloride thus-obtained was added to a solution of 22.2 g. of the (R)-2-hydroxyisocaproic acid benzyl ester obtained above in 150 ml. of dioxan. To this solution there was added dropwise over a period of 45 minutes at 25°–35° a solution of 14 ml. of triethylamine in 30 ml. of dioxan. The resulting suspension was stirred for 2 hours at 25° and for an additional 4 hours at 50°. The triethylamine hydrochloride was filtered off under suction and the filtrate evaporated under reduced pressure at 45°. The resulting oil was dissolved in 150 ml. of ethyl acetate, washed neutral with 3-N hydrochloric acid and washed successively with water, 5% sodium bicarbonate solution and water, dried over magnesium sulfate and evaporated under reduced pressure at 45°. The resulting oil was chromatographed over silicagel with benzene. The uniform fractions, which contained the (R)-2-[(p-methoxyphenoxy)acetoxy]-isocaproic acid benzyl ester, were evaporated under reduced pressure at 45° to yield an oil, $[\alpha]_D^{25} = +19.1°$ ($c = 4.0$ in alcohol). 24 Grams of (R)-2-[(p-methoxyphenoxy)acetoxy]isocaproic acid benzyl ester were hydrogenated in 250 ml. of ethanol with 2.5 g. of palladium/carbon (5%). After the uptake of the theoretical amount of hydrogen was completed, the catalyst was filtered off and the filtrate evaporated under reduced pressure at 45°. The oil thus obtained was dissolved in excess 5% sodium bicarbonate solution and washed twice with 70 ml. portions of ether. The sodium bicarbonate solution was adjusted to a pH of 1 with concentrated hydrochloric acid and extracted twice with 100 ml. portions of ethyl acetate. The ethyl acetate solutions were washed twice with 50 ml. portions of water, dried over magnesium sulfate and concentrated under reduced pressure at 45°. There was thus-obtained (R)-2-[(p-methoxyphenoxy)-acetoxy]isocaproic acid; $[\alpha]_D^{25} = +10.5°$ ($c = 4.0$ in alcohol).

A total of 17 g. of the (R)-2-[(p-methoxyphenoxy)acetoxy]isocaproic acid obtained above, 80 ml. of benzene and 25 ml. of thionyl chloride were boiled under reflux for 3 hours and evaporated under reduced pressure at 45°. The residue was combined with 30 ml. of benzene and evaporated. This operation was repeated and the residue was dried under reduced pressure at 45°. The crude (R)-2-[(p-methoxyphenoxy)acetoxy]isocaproic acid chloride thus-obtained was dissolved in 30 ml. of chloroform and added dropwise at −5° over a period of 20 minutes with stirring to a solution of 12.4 g. of 6-aminopenicillanic acid in a mixture of 100 ml. of chloroform and 16.1 ml. of triethylamine. The mixture was allowed to stand for 20 hours at 0°. The resulting solution was evaporated under reduced pressure at 20°. The residue was suspended in 150 ml. of ethyl acetate and the triethylamine hydrochloride filtered off under suction. The filtrate was extracted twice with 70 ml. portions of ice-water. The aqueous solution was adjusted to a pH of 2 at 5° with 3-N sulfuric acid and extracted twice with 150 ml. portions of ethyl acetate. The combined ethyl acetate phases were washed 3 times with 70 ml. portions of 10% sodium chloride solution, dried over magnesium sulfate, evaporated to about 30 ml. under reduced pressure, treated with 29 ml. of a 2-N solution of sodium 2-ethylcaproate in ethyl acetate and precipitated with a mixture of 200 ml. of absolute ether and 100 ml. of petroleum ether. The precipitate was filtered off under suction, washed with absolute ether and dried at 20°. The sodium salt was dissolved in a mixture of 40 ml. of water and 20 ml. of isopropanol and evaporated under reduced pressure at 20°. The residue was combined with 50 ml. of isopropanol and evaporated. This procedure was repeated and the resulting oil was taken up with 300 ml. of isopropanol. There was thus-obtained [(R)-1-[(p- methoxyphenoxy)acetoxy]-3-methylbutyl]-penicillin sodium; melting point 183° (decomposition); $[\alpha]_D^{25} = +209°$ ($c = 2$ in water).

EXAMPLE 2

In a manner analogous to that described in Example 1 there was obtained utilizing (R)-2-[(p-chlorophenoxy)acetoxy]-isocaproic acid prepared via its benzyl ester, [(R)-1-[(p-chlorophenoxy)acetoxy]-3-methylbutyl]penicillin sodium; melting point 198° (decomposition); $[\alpha]_D^{25} = +199°$ ($c = 2.0$ in water).

EXAMPLE 3

In a manner analogous to that described in Example 1 there was obtained utilizing (R)-2-(phenoxyacetoxy)isocaproic acid prepared via its benzyl ester [(R)-3-methyl-1-(phenoxyacetoxyl)butyl]-penicillin sodium; melting point ca 190° (decomposition); $[\alpha]_D^{25} = +225°$ ($c = 2.0$ in water).

EXAMPLE 4

In a manner analogous to that described in Example 1 there was obtained utilizing (R)-2-[(m-methylphenoxy)acetoxy]-isocaproic acid prepared via its benzyl ester [(R)-3-methyl-1-[(m-methylphenoxy)-acetoxy]butyl]penicillin sodium; melting point ca 180° (decomposition); $[\alpha]_D^{25} = +215°$ ($c = 2.0$ in water).

EXAMPLE 5

A solution of 31.8 g. of (R,S)-2-bromocaproic acid tertbutyl ester, 25 g. of o-nitrophenoxyacetic acid and 17.8 ml of triethylamine in 60 ml. of dimethylformamine was stirred for 4 hours at 95°. The triethylamine hydrobromide which crystallized out was filtered off under suction and the filtrate evaporated at 30°/0.1 Torr. The resulting oil was dissolved in 200 ml. of ethyl acetate, washed with two 50 ml. portions of 10% sodium chloride solution, twice with 50 ml. portions of 5% sodium bicarbonate and with 50 ml. of 10% sodium chloride solution, dried over magnesium sulfate and evaporated. There was thus-obtained (R,S)-2-[(o-nitrophenoxy)-acetoxy]caproic acid tert-butyl ester as an oil. A total of 28 g. of this oil were dissolved in 40 ml. of trifluoroacetic acid, allowed to stand for 12 hours at 20° and evaporated at 30° under reduced pressure. The resulting oil was dissolved in excess 5% sodium bicarbonate solution and washed twice with 70 ml. portions of ether. The pH of the sodium bicarbonate solution was adjusted to pH 1 with concentrated hydrochloric acid. The solution was extracted twice with 100 ml. portions of ethyl acetate. The combined ethyl acetate solutions were washed twice with 50 ml. portions of 10% sodium chloride solution, dried over magnesium sulfate and evaporated under reduced pressure at 40°. The resulting (R,S)-2-[(o-nitrophenoxy)acetoxy]caproic acid was crystallized from ethyl acetate/petroleum ether; melting point 111°–112°.

In a manner analogous to that described in Example 1 there was obtained utilizing the (R,S)-2-[(o-nitrophenoxy)acetoxy]-caproic acid thus-formed [(R,S)-1-[(o-nitrophenoxy)acetoxy]pentyl]-penicillin sodium; melting point ca 110° (decomposition); $[\alpha]_D^{25} = +182°$ ($c = 1.0$ in water).

EXAMPLE 6

In a manner analogous to that described in Example 1 there was obtained from (R)-2-[(o,p-xylyloxy)acetoxy]isocaproic acid prepared via its benzyl ester [(R)-3-methyl-1-[(o,p-xylyloxy)acetoxy]butyl] penicillin sodium; melting point ca 185° (decomposition); $[\alpha]_D^{25} = +196.3°$ ($c = 2.0$ in water).

EXAMPLE 7

In a manner analogous to that described in Example 1 there was obtained from (R)-2-[(p-bis-methylsulfonylamido-phenoxy)acetoxy]isocaproic acid prepared via its benzyl ester [(R)-1-[(p-bis-methylsulfonylamido-phenoxy)acetoxy]-3-methylbutyl]penicillin sodium; melting point ca 158° (decomposition; $[\alpha]_D^{25} = +143.5°$ ($c = 2.0$ in water).

EXAMPLE 8

The following composition was prepared and filed into gelatin capsules:

| | |
|---|---|
| [(R)-3-methyl-1-(phenoxyacetoxy)butyl]-penicillin sodium | 520 mg. |
| Luviskol[1] | 29 mg. |
| Mannitol | 20 mg. |
| Talc | 19 mg. |
| Magnesium stearate | 2 mg. |
| Total | 590 mg. |

[1] A polyvinyl pyrrolidone product manufactured by Badische Anilin u. Sodafabrik, Ludwigshafen am Rhein, German Federal Republic.

The active ingredient was homogeneously blended with the LUVISKOL and mannitol and compressed into slugs. The slugs were then passed through a suitable sieving machine and, after blending with the talc and magnesium stearate, filled into suitable gelatin capsules.

EXAMPLE 9

Reconstitutable injectable preparations were prepared by forming a solution containing 260 mg. [(R)-3-methyl-1-(phenoxyacetoxy)butyl]-penicillin sodium, 1.1 mg. p-hydroxybenzoic acid methyl ester and 0.35 mg. p-hydroxybenzoic acid propyl ester in each two ml., sterilizing said solution by sterile filtration, filling 2.0 ml. thereof aseptically into suitable ampules, lyophilizing the solution and hermetically sealing the ampules. In use, the lyophilized product is reconstituted with 2.0 of water for injection to a total volume of 2.2 ml.

We claim:

1. A compound represented by the formula

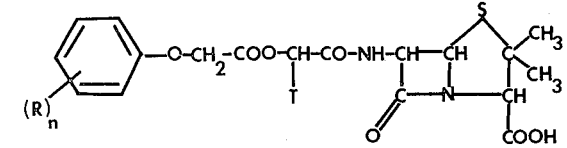

wherein R is halogen, lower alkyl, lower alkoxy, nitro, lower alkoxy-lower alkyl, di-lower alkyl amino, lower alkylsulfonyl amido, bis-lower alkylsulfonylamido or lower alkanoyl-amido, $n$ is an integer of 0–2 and T is a $C_2$–$C_5$ alkyl group, pharmaceutically acceptable salts and hydrated forms thereof.

2. A compound in accordance with claim 1 wherein $n$ is 1 and R is selected from the group consisting of chloro, methyl, methoxy, nitro, dimethylamino, methylsulfonylamido, bismethylsulfonamido and methoxymethyl.

3. A compound in accordance with claim 1 wherein $n$ is 0.

4. A compound in accordance with claim 1 wherein T is an isobutyl group.

5. A compound in accordance with claim 1 wherein the group

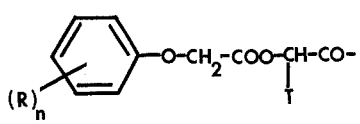

has the R configuration.

6. A compound in accordance with claim 1 wherein said compound is [(R)-1-[(p-methoxyphenoxy)acetoxy]-3-methylbutyl]-penicillin sodium.

7. A compound in accordance with claim 1 wherein said compound is [(R)-1[(p-chlorophenoxy)acetoxy]-3-methylbutyl]-penicillin sodium.

8. A compound in accordance with claim 1 wherein said compound is [(R)-3-methyl-1-(phenoxyacetoxy)-butyl]penicillin sodium.

9. A compound in accordance with claim 1 wherein said compound is [(R)-3-methyl-1-[(m-methylphenoxy)-acetoxy]butyl]-penicillin sodium.

10. A compound in accordance with claim 1 wherein said compound is [(R,S)-1-[(o-nitrophenoxy)acetoxy[pentyl]-penicillin sodium.

11. A compound in accordance with claim 1 wherein said compound is [(R)-3-[(o,p-xylyloxy)acetoxy]-butyl]-penicillin sodium.

12. A compound in accordance with claim 1 wherein said compound is [(R)-1-[(p-bis-methyl-sulfonyl-amidophenoxy) acetoxy]-3-methylbutyl]-penicillin sodium.

* * * * *